United States Patent
Gurney et al.

(10) Patent No.: US 10,038,203 B2
(45) Date of Patent: Jul. 31, 2018

(54) COOLING PLATES FOR FUEL CELLS

(71) Applicant: Intelligent Energy Limited, Loughborough (GB)

(72) Inventors: Christopher James Gurney, Loughborough (GB); Paul Leonard Adcock, Loughborough (GB); Carl Christie, Loughborough (GB); Lydia Jowsey, Loughborough (GB); Simon Stevenson, Loughborough (GB); Christopher Conlon, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 19 days.

(21) Appl. No.: 15/300,705

(22) PCT Filed: Mar. 27, 2015

(86) PCT No.: PCT/GB2015/050943
§ 371 (c)(1),
(2) Date: Sep. 29, 2016

(87) PCT Pub. No.: WO2015/150754
PCT Pub. Date: Oct. 8, 2015

(65) Prior Publication Data
US 2017/0110740 A1    Apr. 20, 2017

(30) Foreign Application Priority Data

Mar. 31, 2014    (GB) .................................. 1405702.0

(51) Int. Cl.
*H01M 8/02*    (2016.01)
*H01M 8/0267*    (2016.01)
(Continued)

(52) U.S. Cl.
CPC ......... *H01M 8/0267* (2013.01); *H01M 8/021* (2013.01); *H01M 8/026* (2013.01);
(Continued)

(58) Field of Classification Search
CPC ............... H01M 8/0267; H01M 8/026; H01M 8/04014; H01M 8/021; H01M 8/0254; H01M 8/0265; H01M 8/0206
See application file for complete search history.

(56) References Cited

U.S. PATENT DOCUMENTS

2005/0170234 A1    8/2005    Liu et al.
2005/0266296 A1    12/2005    An et al.
(Continued)

FOREIGN PATENT DOCUMENTS

EP    39236    11/1981
EP    1265303    12/2002
(Continued)

OTHER PUBLICATIONS

International Search Report and Written Opinion in International Patent Application No. PCT/GB2015/050943 dated Oct. 8, 2015.
(Continued)

*Primary Examiner* — Stewart A Fraser
(74) *Attorney, Agent, or Firm* — Baker & Hostetler LLP

(57) ABSTRACT

A separator plate in an air-cooled fuel cell comprises a series of airflow channels, each channel extending longitudinally between first and second opposing edges of the separator plate. Each channel has a cross-sectional profile defining an airflow cross-section at points along the length of the channel, and at least selected ones of the channels each have a thermally conductive structure extending into the channel cross-section at selected intermediate longitudinal positions of the channel. The positions are disposed over an active area of the fuel cell, to locally enhance heat transfer from the
(Continued)

active area via the plate to airflow moving through the channel.

16 Claims, 7 Drawing Sheets

(51) Int. Cl.
*H01M 8/026* (2016.01)
*H01M 8/0254* (2016.01)
*H01M 8/0265* (2016.01)
*H01M 8/021* (2016.01)
*H01M 8/04014* (2016.01)
*H01M 8/0206* (2016.01)

(52) U.S. Cl.
CPC ....... *H01M 8/0254* (2013.01); *H01M 8/0265* (2013.01); *H01M 8/04014* (2013.01); *H01M 8/0206* (2013.01)

(56) References Cited

U.S. PATENT DOCUMENTS

| | | | |
|---|---|---|---|
| 2007/0298311 A1 | 12/2007 | Zeng et al. | |
| 2008/0050632 A1* | 2/2008 | Salter | H01M 8/0232 429/434 |
| 2015/0171436 A1* | 6/2015 | Lee | H01M 8/0267 429/457 |
| 2016/0164111 A1* | 6/2016 | Han | H01M 8/2415 429/457 |

FOREIGN PATENT DOCUMENTS

| | | |
|---|---|---|
| EP | 2330668 | 6/2011 |
| JP | H01235160 | 9/1989 |
| JP | 06-068887 A | 3/1994 |
| WO | 2013105956 | 7/2013 |

OTHER PUBLICATIONS

Search Report in GB Patent Application 1405702.0 dated Sep. 25, 2014.

* cited by examiner

COOLING PLATES FOR FUEL CELLS

CROSS-REFERENCE TO RELATED APPLICATIONS

This patent application is a National Stage Application of international patent application PCT/GB2015/050943 filed Mar. 27, 2015, which claims priority to Great Britain patent application 1405702.0 filed Mar. 31, 2014, the disclosures of which are incorporated by reference in their entirety.

The invention relates to separator plates for fuel cells, and in particular to separator plates providing cooling and/or oxidant air flows to active areas of the cells.

In open cathode fuel cell stacks, air flow is directed across the cathode side of each fuel cell, so that oxidant is available to the cathode side of the membrane-electrode assembly (MEA) of the fuel cell, typically via a diffusion layer. To achieve a uniform flow of air across an entire stack, a common arrangement is to provide air flow in parallel across the cell stack between opposing faces of the stack, so that air flows across each cell, from one edge of the cell to an opposing edge of the cell.

A typical way of achieving a sufficient degree of air flow across each cell of a stack, while keeping the overall weight of the stack down, is through using corrugated cathode separator plates. Such separator plates act both to form an electrical connection with the cathode side of the fuel cell electrolyte and to provide the pathways for air flow across an underlying diffuser layer. The separator plates define a set of parallel flow channels across the width of each plate, the channels each extending along the length of each plate.

Other types of fuel cell stacks may deploy corrugated separator plates for the purpose of cooling air flows only, the cathode (oxidant) air flows being provided separately.

For optimum performance of fuel cell stacks, it is desirable to maintain adequate cooling across an entire surface of each cell, both laterally across the width of each plate and longitudinally along the length of each channel in the plate.

It is an object of the invention to provide improvements in the cooling profile provided by such separator plates.

According to one aspect, the invention provides a separator plate in an air-cooled fuel cell comprising:

a series of airflow channels, each channel extending longitudinally between first and second opposing edges of the separator plate, each channel having a cross-sectional profile defining an airflow cross-section at points along the length of the channel, and at least selected ones of the channels each having a thermally conductive structure extending into the channel cross-section at selected intermediate longitudinal positions of the channel, the positions being disposed over an active area of the fuel cell, to locally enhance heat transfer from the active area via the plate to airflow moving through the channel.

The thermally conductive structure extending into the channel cross-section may be a fin. The thermally conductive structure extending into the channel cross-section may comprise one or more bumps. The thermally conductive structure extending into the channel cross-section may be a partition wall extending to the height or width of the channel cross-section. The fin or bump may vary in height as a function of distance along the length of the channel. The height may increase as a function of distance along the length of the channel. The thermally conductive structure may extend into the channel cross-section only within the second longitudinal half of the channel. The thermally conductive structure may extend into the channel cross-section only within the final longitudinal third of the channel. The thermally conductive structures may vary in size for different channels in the series of channels. The thermally conductive structures may vary in length for different channels in the series of channels. The thermally conductive structures may vary in thermal conductivity along the length of the channel. A fin or ridge may divide a channel into at least two airflow cross-sections each providing substantially laminar flow. A partition wall may divide a channel into two or more sub-channels. A bump may lie in a channel wall opposite a recess. The series of airflow channels may be defined by a first corrugated plate, and the thermally conductive structures extending into the channel cross-sections may be defined by a second corrugated plate disposed adjacent to the first corrugated plate, and the second corrugated plate may have corrugations laterally offset from the corrugations of the first corrugated plate. The lateral offset of the corrugations may be created by the first and second corrugated plates having either (i) a different spatial frequency of corrugation, or (ii) the same spatial frequency of corrugation but with a phase shift therebetween.

Embodiments of the present invention will now be described by way of example and with reference to the accompanying drawings in which.

Figure 4:
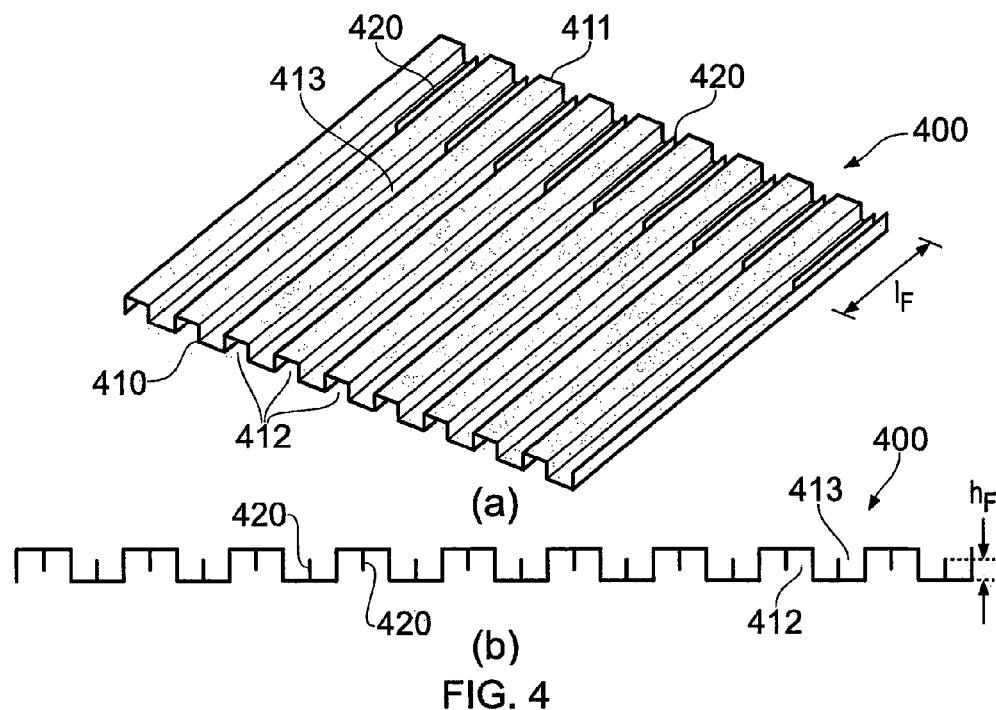
Figure 5:
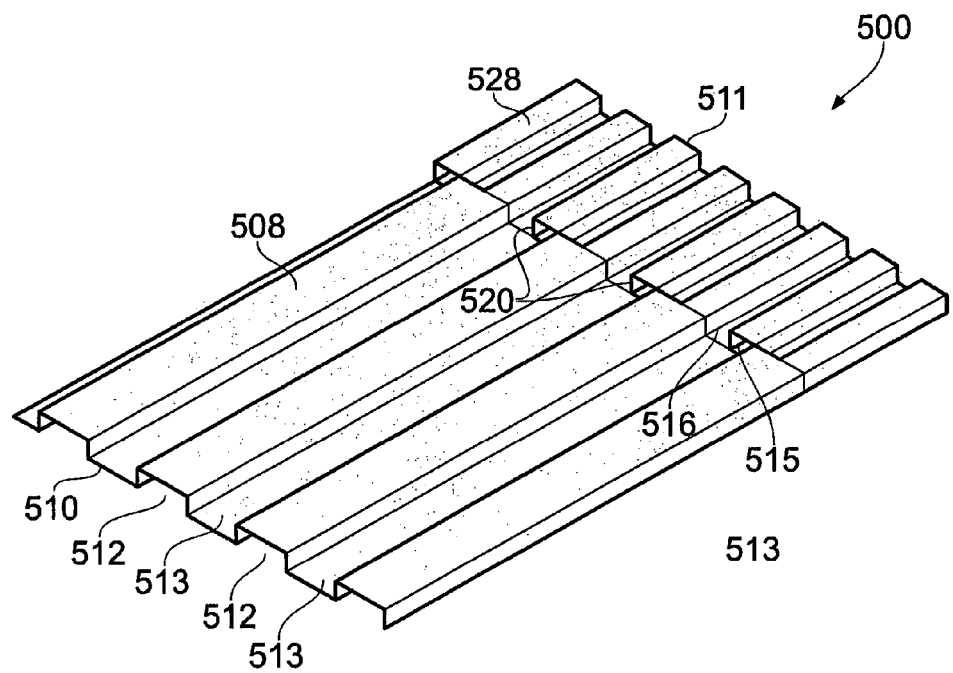
Figure 8:
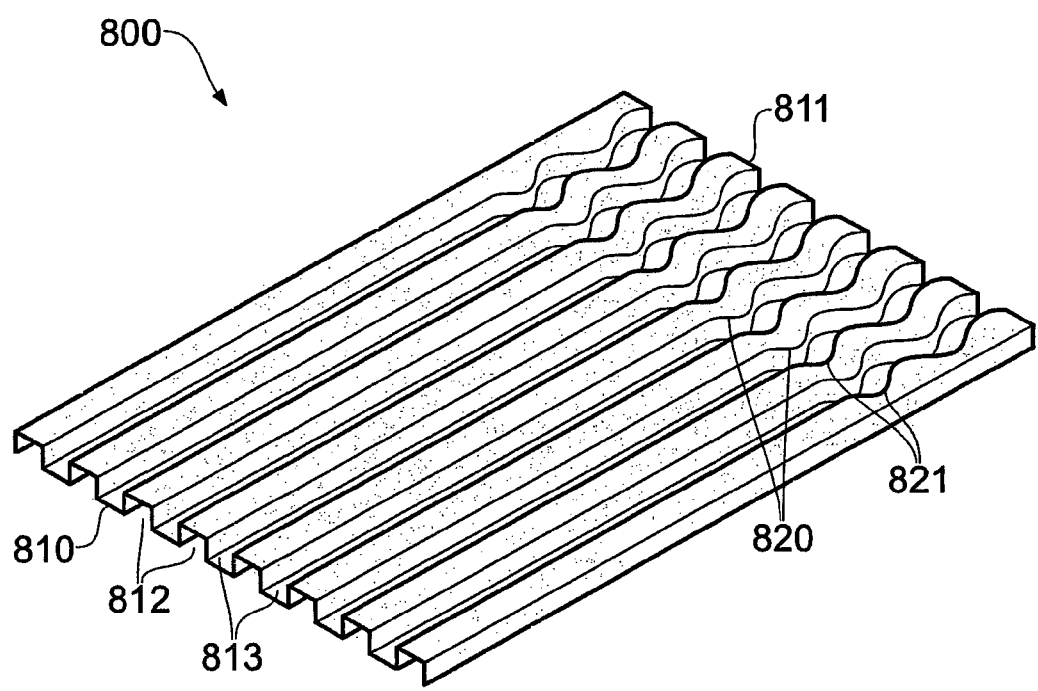
Figure 9:
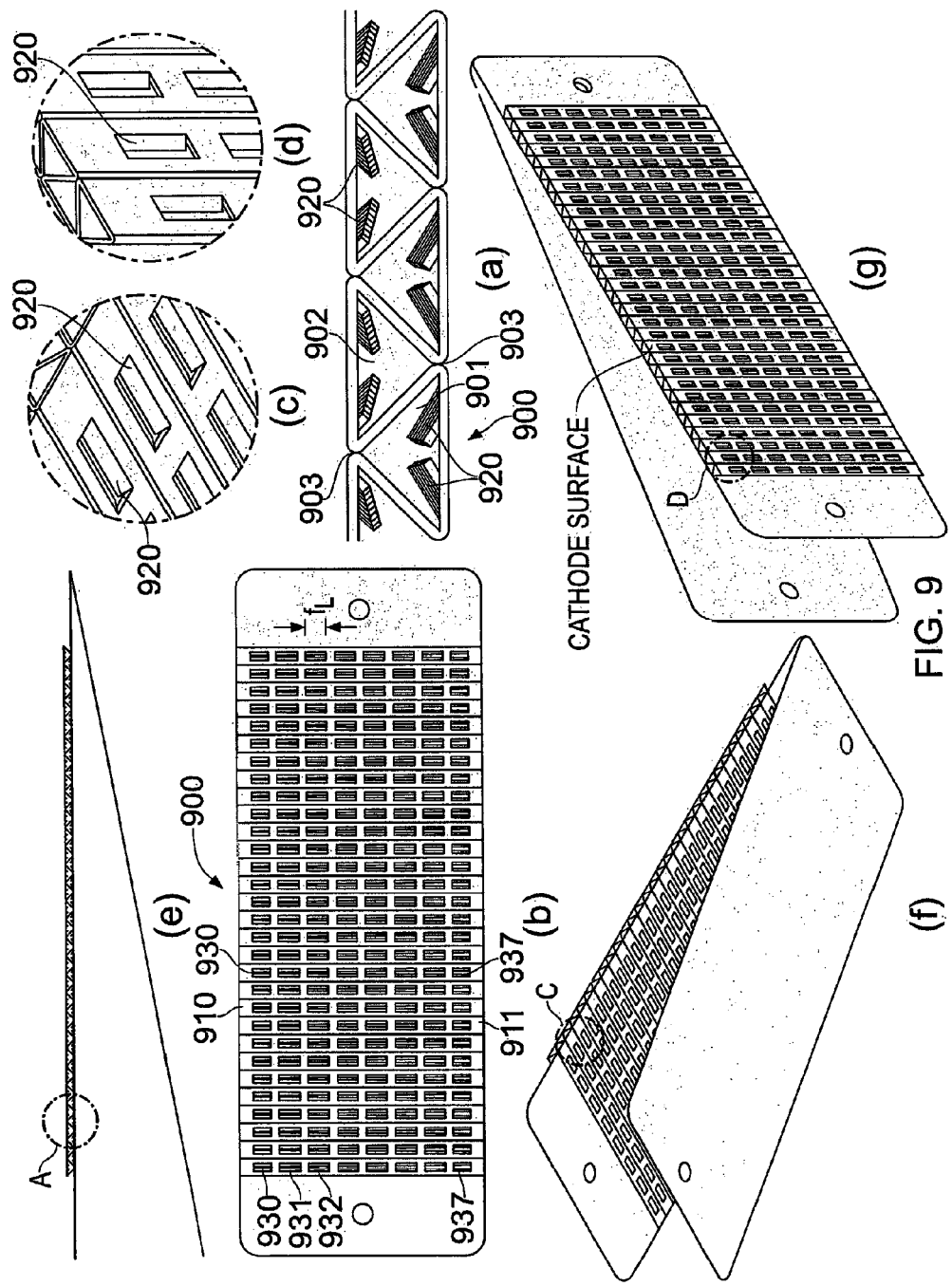
Figure 10:
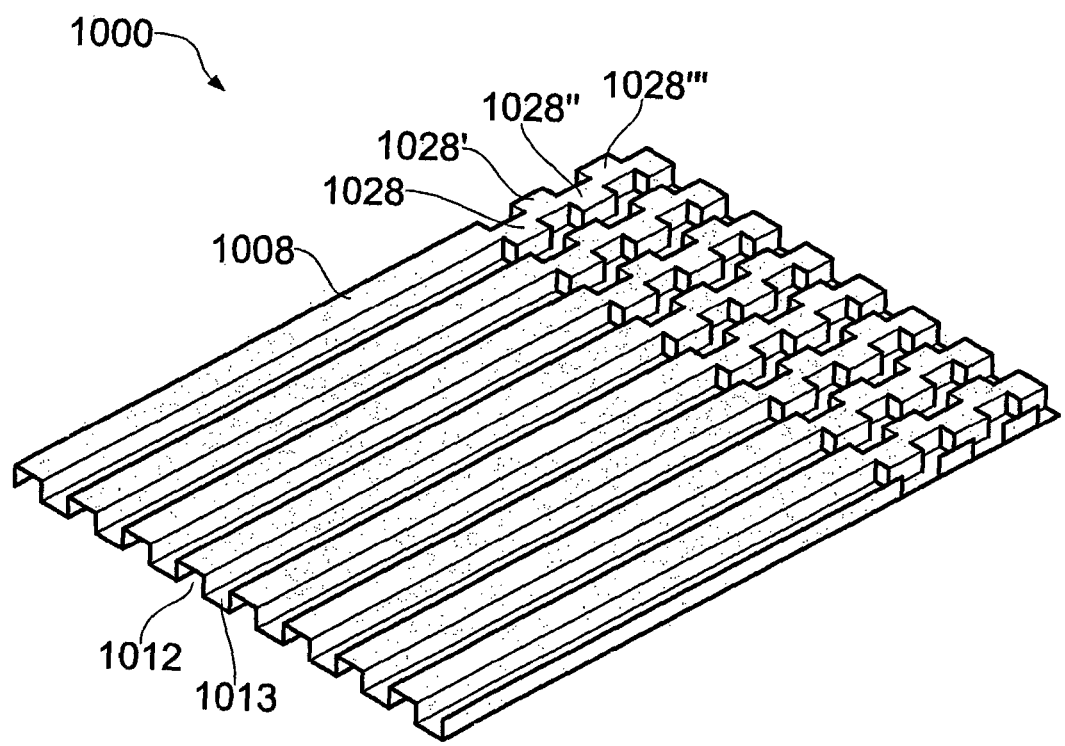

FIGS. 4a and 4b respectively show a perspective view and an end view of a cathode separator plate having fins in the channels;

FIG. 5 shows a perspective view of a cathode separator plate having partition walls in the channels, with channels of reduced width after the partition;

FIGS. 6a and 6b respectively show a perspective view and an end view of a cathode separator plate having partition walls in the channels;

FIGS. 7a and 7b respectively show a perspective view and an end view of a cathode separator plate having airflow disrupting bumps in the channels;

FIG. 8 shows a perspective view of a cathode separator plate having lateral airflow disrupting bumps in the channels;

FIG. 9 shows an alternative cathode separator plate with triangular configuration channels, in which FIG. 9a shows magnified end view detail of the separator plate seen in end view of FIG. 9e; FIG. 9b shows a plan view of the cathode face of the plate; FIG. 9c shows magnified detail of the plate as seen in the perspective view of FIG. 9f; and FIG. 9d shows magnified detail of the plate as seen in the perspective view of FIG. 9g; and FIG. 10 shows a perspective view of a cathode separator plate similar to that of FIG. 6a but with multiple offset corrugations.

Figure 1:
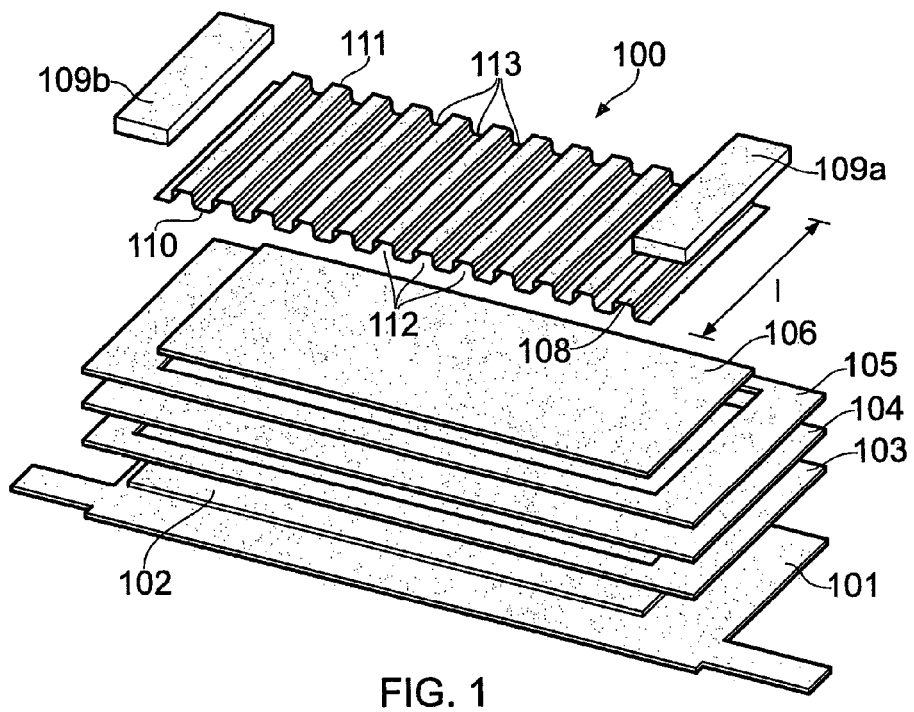
FIG. 1 shows an exploded perspective view of components of a fuel cell.

FIG. 1 shows an exploded perspective view of an illustrative air-cooled fuel cell assembly 100. The fuel cell assembly 100 comprises, in sequential order, an anode plate 101, an anode side diffuser layer 102, an anode gasket 103, a membrane electrode assembly (MEA) 104, a cathode gasket 105, a cathode side diffuser layer 106, a corrugated cathode separator plate 108 and a pair of gaskets 109a, 109b.

The corrugated cathode separator plate 108 has a first edge 110 and a second, opposing, edge 111 and defines a series of airflow channels 112, 113 extending longitudinally between the first and second opposing edges of the separator plate 108.

The fuel cell assembly 100 of FIG. 1 may be repeated many times in a layered construction to form a fuel cell stack, for example comprising several tens or even hundreds of cells all contained in a stack between a pair of end plates.

Figure 2:
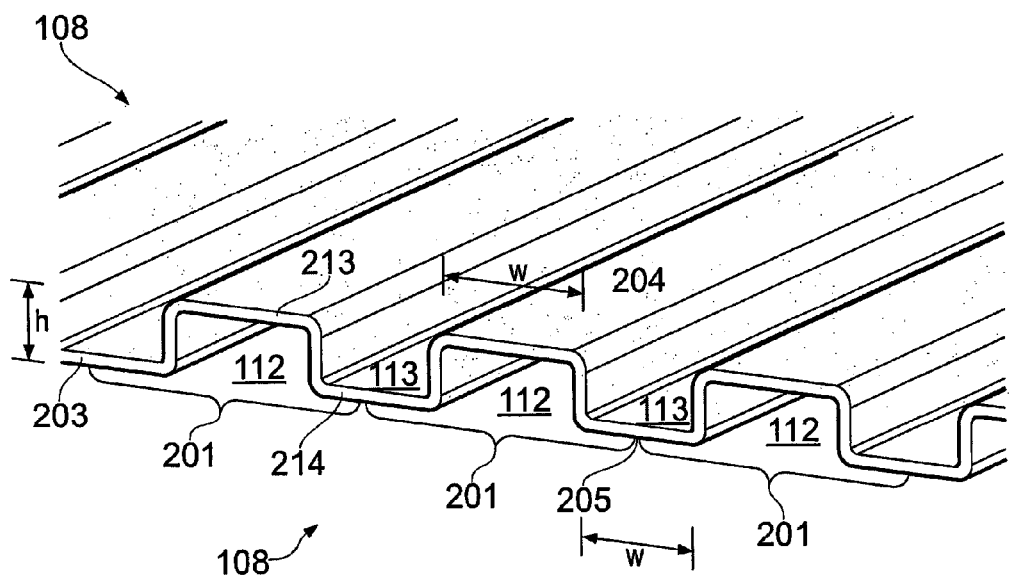
FIG. 2 shows a perspective view of a cathode separator plate in the fuel cell of FIG. 1.

FIG. 2 shows an expanded view of a part of the corrugated cathode separator plate 108. The separator plate has first and second opposing faces 204, 205. The plate 108 has a series of corrugations 201 defining the series of airflow channels 112, 113 extending between the first and second opposing edges 110, 111. Each corrugation 201 in the plate 108 comprises a crest 213 and a trough 214 defining the air flow channels 112, 113. The thickness of the plate 108, i.e. the separation between the plane of all the crests 213 and the plane of all the troughs 214 corresponds to the channel height h. The separation between a pair of adjacent crests 213, or between a pair of adjacent troughs 214, corresponds to the channel width w. The distance between the first and second opposing edges 110, 111 corresponds to the channel length l (seen in FIG. 1).

The function of the corrugated cathode separator plate 108 may be generally described as providing a series of airflow channels 112, 113 each of which has a cross-sectional profile defining an airflow cross-section at any particular longitudinal point along the length l of the channels 112, 113. In the example of FIGS. 1 and 2, the airflow channels 112, 113 are rectangular in cross-section, do not vary in width or depth along their length, and do not vary from channel to channel. However, it is possible to have cross-sectional profiles other than rectangular, and it is also possible to vary the cross-sectional profiles of the airflow channels 112, 113, along their lengths, or from adjacent channel to channel, or both.

The air flow channels 112 are 'face downwards' as drawn in FIGS. 1 and 2, i.e. open towards the cathode diffuser 106 and underlying MEA, thereby supplying air as both oxidant and cooling to the active area of the fuel cell. The active area of the fuel cell may be defined as the area of MEA exposed to anode and cathode fluid flows (fuel and oxidant) via the plates 101, 108 and the diffusers 102, 106. In contrast, the airflow channels 113 are 'face upwards' as drawn in FIGS. 1 and 2, and will be closed at the top by being adjacent to the lower surface of an anode plate 101 of an adjacent cell. As such, the airflow channels 113 provide cooling airflow only and do not supply oxidant to the MEA.

An important function of the airflow channels 112, 113 is to enable the flowing air to extract heat from the separator plate. The separator plate is preferably formed from a suitable electrically and thermally conductive material such as stainless steel. Heat generated by the fuel cell in the active area must be extracted from the fuel cell stack to prevent damage to the MEA 104. Straight, uniform cross-section channels 112, 113 such as shown in FIGS. 1 and 2 offer good, fast airflows which provide low impedance, low pressure drop and high throughput of cooling air.

However, it has been observed that although uniform cross-section, straight channels offer high throughput, they tend towards a near laminar flow condition, resulting in a significant temperature gradient across the channel cross-section.

Figure 3:
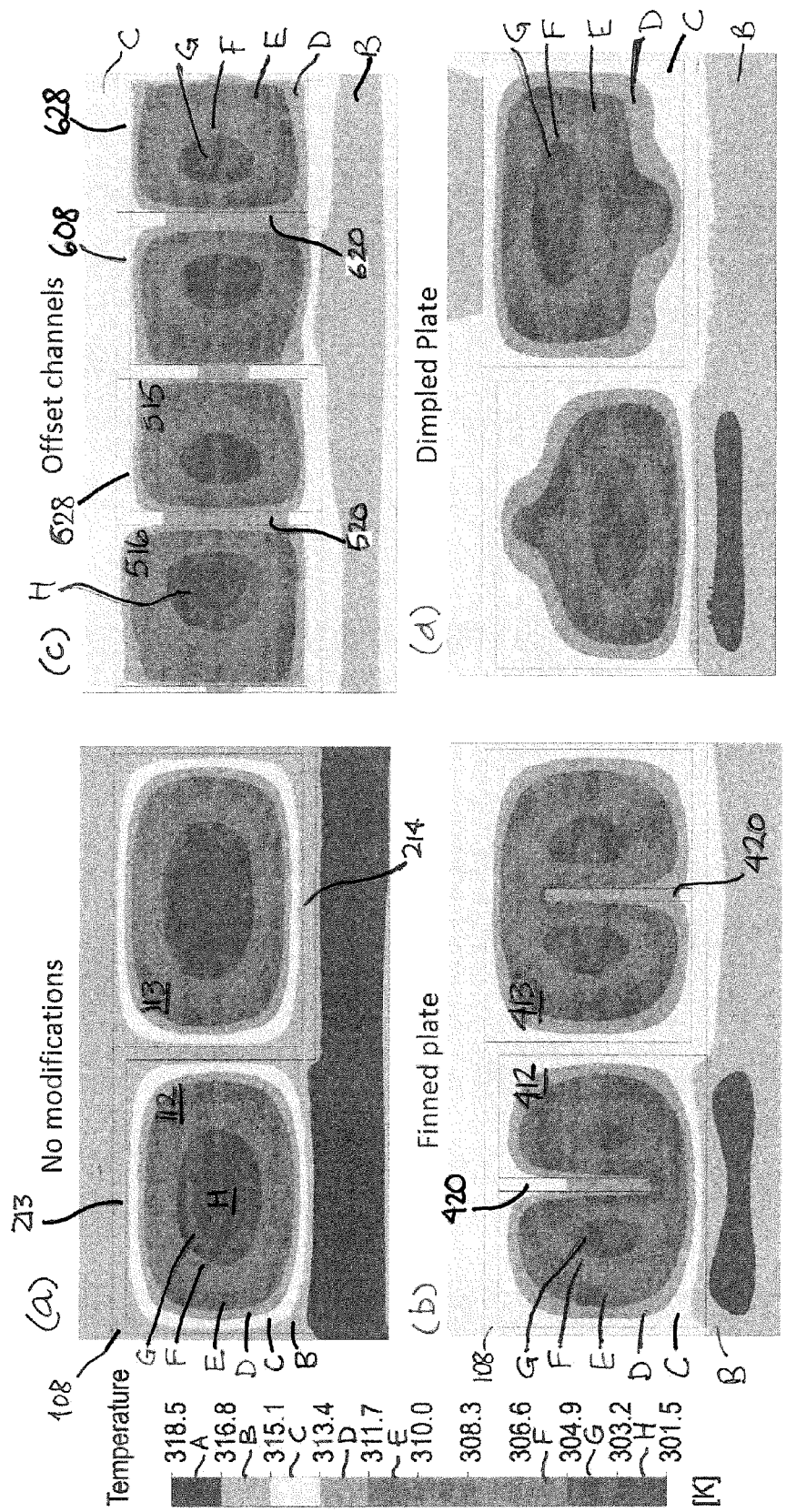
FIGS. 3a to 3d show simulated temperature profiles of the cross-sectional airflow through the rectangular flow channels of the cathode separator plates of FIGS. 2, 4a, 4b, 6a, 6b and 7.

FIG. 3a shows a simulated temperature profile of the rectangular channel cross-sections of channels 112, 113 defined by crests 213 and troughs 214. It can be seen in FIG. 3a that the highest temperature band A (indicated in degrees K in the colour scale of the left hand side of the drawing) is exhibited at the fuel cell active area (diffuser 106 and MEA 104) adjacent to the plate 108. In the channel 112 it can be seen that the temperature gradient across the channel cross-section is from temperature band B adjacent the channel walls to a large region of temperature band F, G, H in the centre of the cross-section. A similar profile is seen in channel 113, where the cool region of temperature bands F, G, H is somewhat larger, possibly due to the absence of direct air flow into the diffuser 106 and heat transfer therefrom. In the example, the temperature gradient may be up to 15 degrees K in a channel having a width of approximately 2.2 mm for cooling channels 113 and 2.05 mm for oxidant and cooling channels 112 and a height of 1.4 mm and occurs at a distance along the channel of 40 mm in a cell having channel length l=50 mm and plate width of 166.9 mm. In this example, the plate width represents a total width of the channels not including a portion extending under the gaskets 109a, 109b (FIG. 1). The simulation considers two channels and the model uses symmetry on left/right and top/bottom boundaries, showing results for an infinite number of channels. The temperature gradient shown may be caused by thermal boundary layers that occur in laminar flows in channels of small geometries. This temperature gradient indicates potentially unexploited additional cooling capacity if the lower temperatures found in the centre of the channel cross-section can be used.

One possibility is to divide the channels 112, 113 into yet smaller channels, thereby diminishing the cross-sectional size. However, this has a disadvantage in that smaller channels provide a greater airflow resistance thereby requiring a higher pressure differential from the channel inlets to the channel outlets to maintain air throughput. This may require higher capacity fans for a fuel cell stack, and thus may result in larger parasitic losses in the fuel cell support infrastructure.

Another important consideration is that as airflows move along the length l of the channels 112, 113, the temperature of the airflows will rise, resulting in a thermal gradient across the active area of the fuel cell. The thermal transfer of heat to the airflows in the channels 112, 113 will therefore become less effective as the temperature of the airflows rises from inlet end (first edge 110) to outlet end (second edge 111). Overheating may then occur in localised hotspots, particularly towards the outlet edge 111 of the separator plate 108.

Various different structures are now described which provide increased heat transfer from the plate 108 to the airflow at selected intermediate longitudinal positions along the channels. These structures are designed to disrupt any thermal boundary layer that may limit the performance of laminar flow air cooling.

FIGS. 4a and 4b show a first arrangement of separator plate 400 in which the channels 412, 413 each include a thermally conductive structure in the form of a fin 420 which extends into the channel cross-section towards the outlet end 411 of the channel 412. In the example, the fins 420 extend upwards from the bases of channels 413 and, as seen in FIG. 4b, extend downwards from the peak of channels 412. In alternative arrangements (not shown in FIGS. 4a and 4b, the fins could extend into the channel cross-sections laterally, e.g. horizontally in the orientation of the drawings. Similarly, the fins could extend obliquely into the channel cross-sections.

The fins 420 can be disposed at any desired location or multiple locations along the lengths of the channels, and can be different from channel to channel. More generally, the fins 420 exemplify thermally conductive structures which extend into the channel cross-sections at any selected intermediate longitudinal positions in the channels, somewhere over the active area of the fuel cell. More than one fin could be deployed in each channel. The fins can extend any desired distance along the channels. Most preferably, the fins 420 are positioned towards the outlet end (second edge 411) since this is where heat build-up in the airflows tends to occur. For example, the fins 420 could occupy the second longitudinal half of the channel length, or the final longitudinal one-third of the channel length, approximately as exemplified in FIG. 4a. More generally, the thermally conductive structure exemplified by the fins 420 may extend into the channel cross-section only somewhere, or everywhere, within a downstream portion of the channel length, such as the second longitudinal half of the channel length, or the final longitudinal one-third of the channel length.

The height $h_f$ of the fins may be somewhat less than the height h of the channels. The height $h_f$ of the fins may vary along the length $l_f$ of the fins. In one arrangement, the fins may vary in height as a function of distance along the length of the channel, and the variation in fin height may be increasing towards the outlet end of the channel. In this way, surface area for thermal transfer to the airflows may increase towards the outlet end of the channel. The expression 'height' $h_f$ of the fin is intended to indicate the distance that the fin extends into the channel cross-section from the channel wall, regardless of whether that distance is in a vertical, horizontal or oblique direction relative to the plane of the separator plate.

The fins 420 may be intermittent along the lengths of the channels 412, 413. The periodicity may vary as a function of distance along the length of the channel. The periodicity may provide an increase in lengths of fins towards the outlet end of the channel. In this way, surface area for thermal transfer to the airflows may on average increase towards the outlet end of the channel.

FIG. 3b shows a simulated temperature profile of the channel cross-sections of channels 412, 413 where a fin 420 has been extended into the cross-sectional airflow of each channel. It can be seen in FIG. 3b that the regions F, G, H of lowest temperatures have been substantially diminished in size, and fragmented into two parts on either side of each fin 420. The fin has effectively transferred a significant quantity of heat into the previously coldest region of the cross-section and therefore exploited additional cooling capacity of the lower temperatures previously found in the centre of the channel cross-section. With appropriate design of fin 420, the fin can allow substantially laminar flow through the channel to be maintained thereby exploiting significant additional cooling capacity without substantial increase in airflow impedance.

The ability to remove more heat from the channels without increasing air flow or channel volumes enables fuel cell stacks to operate at higher current levels without commensurately increasing channel volumes. This improves the current capacity per unit volume of the fuel cells.

FIG. 5 shows a second arrangement of separator plate 500 in which the channels 512, 513 each include a thermally conductive structure in the form of a partition wall 520 which extends into the channel cross-section towards the outlet end 511 of the channel 512. In the example, the partition wall extends upwards from the base of channels 513 or downwards from the peak of channels 512. In alternative arrangements (not shown in FIG. 5) the partition walls 520 could extend horizontally or obliquely across the channel cross-sections. The partition wall or walls 520 may effectively divide a channel 512 or 513 into two or more sub-channels 515, 516. In the example shown in FIG. 5, the partition wall 520 can be effectively constructed by providing a second corrugated separator plate 528 having a corrugation frequency twice that of the first corrugated plate 508. It will be recognised that any difference in frequency of corrugation may be used that will result in channel walls of the second separator plate 528 effectively dividing the channel 512 or 513 cross-section into two or more parts. In the illustrated example of FIG. 5, the channels 512, 513 of the first corrugated plate 508 are double width compared to the channels 112, 113 of the plate of FIG. 2 and the channels or sub-channels 515, 516 of the second corrugated plate 528 are the same width as the channels 112, 113 of the plate of FIG. 2. Although the partition wall 520 effectively reduces the channel dimensions, from one large channel to two or more smaller channels, thereby increasing the airflow impedance, it does so only for limited selected intermediate longitudinal positions of the channel while providing substantially improved thermal transfer at a position on where it is most required. It therefore does not have the high impedance to airflow that would be characteristic of narrow channels over the entire length of the separator plate. Overall, this may reduce pressure drop so that airflow can be maintained with lower fan power thereby reducing parasitic losses.

Similar to the arrangements described in connection with FIGS. 4a and 4b, the partition walls 520 can be disposed at any desired location or multiple locations along the lengths of the channels, and can be different from channel to channel. More generally, the partition walls 520 exemplify thermally conductive structures which extend into the channel cross-sections at any selected intermediate longitudinal positions in the channels, somewhere over the active area of the fuel cell. More than one partition wall 520 could be deployed in each channel 512, 513. The partition walls can extend any desired distance along the channels. Most preferably, the partition walls 520 are positioned towards the outlet end (second edge 511) since this is where heat build-up tends to occur. For example, the partition walls 520 could occupy the second longitudinal half of the channel length, or the final longitudinal third of the channel length, approximately as exemplified in FIG. 5. More generally, the thermally conductive structure exemplified by the partition walls may occupy the channel cross-section only somewhere, or everywhere, within a downstream portion of the channel length, such as the second longitudinal half of the channel length, or the final longitudinal third of the channel length.

The partition walls 520 may be intermittent along the lengths of the channels 512, 513. The periodicity may vary as a function of distance along the length of the channel. The periodicity may provide an increase in length of the partition wall towards the outlet end of the channel. In this way, surface area for thermal transfer to the airflows may on average increase towards the outlet end of the channel.

Figure 6:
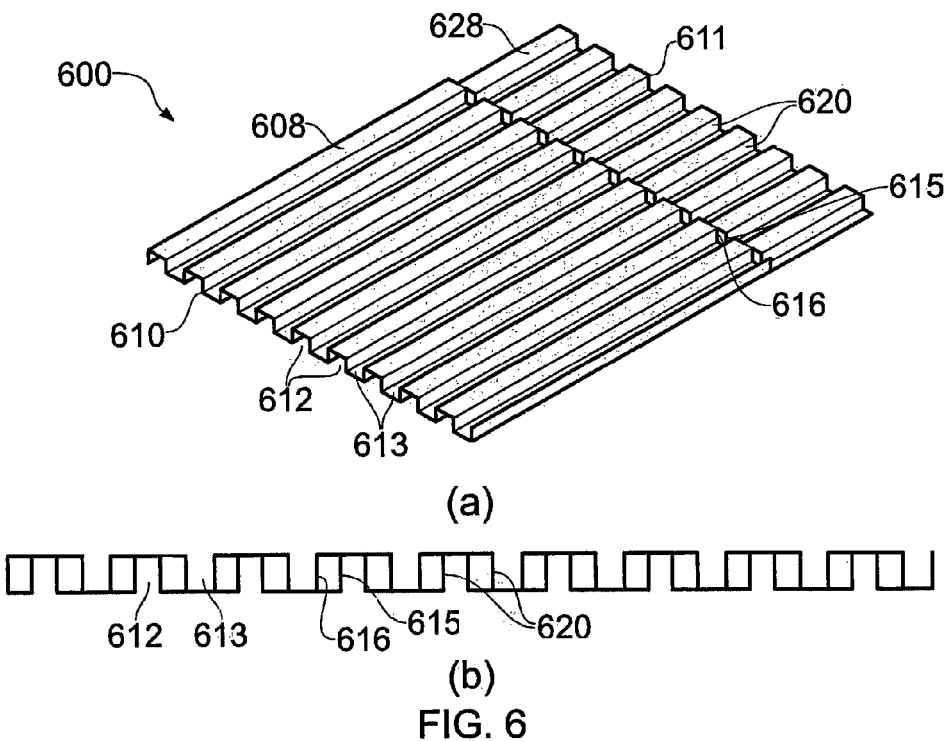

FIG. 6 shows another variation 600 of the separator plate arrangement 500 shown in FIG. 5. In FIG. 5, the partition wall 520 was provided by a second corrugated separator plate 528 having a corrugation spatial frequency twice that of the first corrugated plate 508, with zero offset. In FIG. 6, the partition wall 620 is provided by a second corrugated separator plate 628 having a corrugation spatial frequency the same as that of the first corrugated plate 608, but with $\pi/2$ phase offset. It will be recognised that any offset of corrugation may be used that will result in channel walls of the second separator plate 628 effectively dividing the channel 612 or 613 cross-section into two or more parts. The π/2 offset shown may, however, present an optimal configuration by placing the partition walls 620 exactly in the middle of channels 612 and 613 thereby maximising thermal transfer to the coldest part of the airflows while minimising increased airflow impedance. In such a configuration, the thermal profile is similar to that shown in FIG. 3c.

FIG. 3c shows a simulated temperature profile of the channel cross-sections of channels 612, 613 where a partition wall 620 has been extended into the cross-sectional airflow of each channel. It can be seen in FIG. 3c that the regions F, G, H of lowest temperatures have been substantially diminished in size, and fragmented into two parts on either side of each partition wall 620. The partition wall 620 has effectively transferred a significant quantity of heat into the previously coldest region of the cross-section and therefore exploited additional cooling capacity of the lower temperatures previously found in the centre of the channel cross-section.

In a general aspect, it can be seen that the arrangements of FIGS. 5 and 6 exemplify structures in which the series of airflow channels is defined by a first corrugated plate 508, 608, and in which the thermally conductive structures extending into the channel cross-sections are defined by a second corrugated plate 528, 628 disposed adjacent to the first corrugated plate longitudinally, the second corrugated plate having corrugations that are laterally offset from the corrugations of the first corrugated plate. The lateral offset of the corrugations is created by the first and second corrugated plates having either (i) a different spatial frequency of corrugation (as exemplified by FIG. 5) or (ii) the same spatial frequency of corrugation but with a phase shift therebetween (as exemplified by FIG. 6).

Other optional features, such as longitudinal positioning, described in connection with the arrangement of FIG. 5 apply also to the arrangement of FIG. 6 and need not be discussed further here. More than two corrugated plates may be used to create multiple lateral offsets along the length of the channels, such as exemplified in the separator plate 1000 of FIG. 10. In FIG. 10, the first corrugated plate 1008 defines channels 1012, 1013, second corrugated plate 1028 defines laterally offset channels having a first offset; third corrugated plate 1028' defines laterally offset channels having a second offset; fourth corrugated plate 1028" defines laterally offset channels having a third offset; and so on. As shown, the first and third offset can be π/2 relative to the corrugations of plate 1008, and the second and fourth offset can be zero relative to the corrugations of plate 1008.

The corrugated plates 1008, 1028, 1028', 1028" etc can be formed as a unitary structure from a single sheet, defining the separator plate, being cut and pressed or otherwise formed into the sheet. The same applies respectively to first and second corrugated plates 508, 528, 608, 628.

It can be seen that the arrangements of FIGS. 5 and 6 effectively divide a channel 512, 513 or 612, 613 into two sub-channels 515, 516 or 615, 616, for a part of the overall channel length, but in the case of FIG. 6, the airflow in sub-channel 616 from main channel 613 and the airflow in sub-channel 615 from main channel 612 may effectively mix/combine, at least for the longitudinal extent of the partition wall 620.

Figure 7:
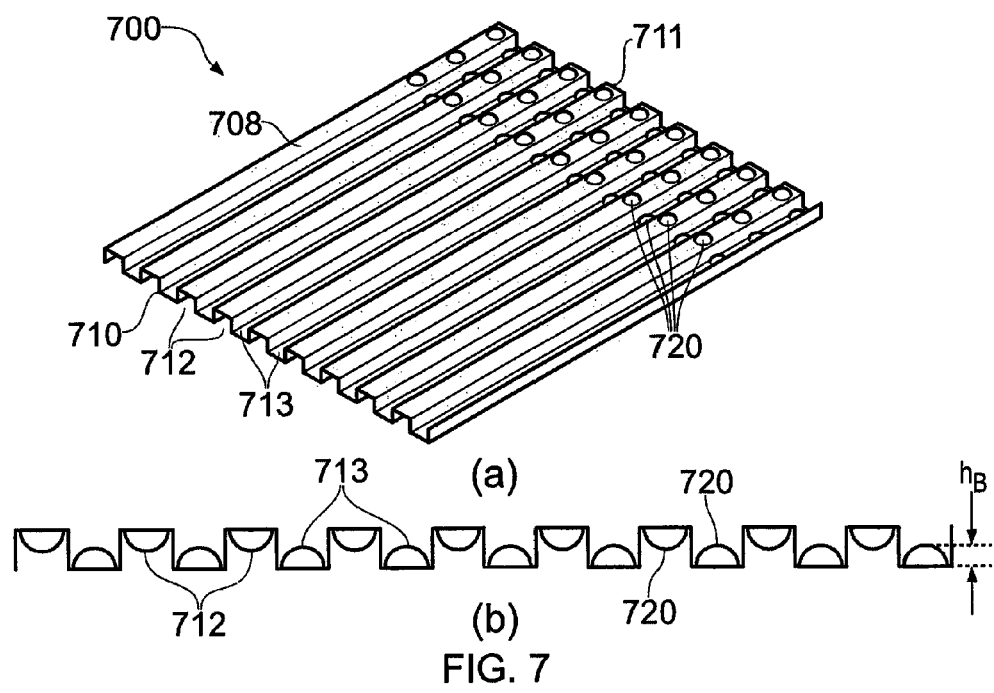

FIG. 7 shows another arrangement of separator plate 700 in which the channels 712, 713 each include a thermally conductive structure in the form of a bump 720 which extends into the channel cross-section towards the outlet end 711 of the channel 712, 713. In the example, the bump extends upwards from the base of channels 713 and the bump extends downwards from the peak of channels 712. In alternative arrangements (not shown in FIGS. 7a and 7b), the bumps could extend into the channel cross-sections laterally, e.g. horizontally in the orientation of the drawings.

The bumps may comprise any protuberance such as a round or elliptical boss, an elongated ridge, an embossed profile or dimple in the sheet of plate 708. The bumps 720 can be disposed at any desired location or multiple locations along the lengths of the channels, and can be different from channel to channel. More generally, the bumps 720 exemplify thermally conductive structures which extend into the channel cross-sections at any selected intermediate longitudinal positions in the channels, somewhere over the active area of the fuel cell. More than one bump could be deployed in each channel as shown in FIG. 7a. The bumps can extend any desired distance along the channels. Most preferably, the bumps 720 are positioned towards the outlet end (outlet end 711) since this is where heat build-up tends to occur. For example, the bumps 720 could occupy the second longitudinal half of the channel length, or the final longitudinal third of the channel length, approximately as exemplified in FIG. 7a. More generally, the thermally conductive structure exemplified by the bumps 720 may extend into the channel cross-section only somewhere, or everywhere, within a downstream portion of the channel length, such as the second longitudinal half of the channel length, or the final longitudinal third of the channel length.

The height $h_b$ of the bumps is preferably somewhat less than the height h of the channels. The height $h_b$ of the bumps may vary according to their longitudinal position in the channels. In one arrangement, the bump may increase towards the outlet end of the channel. The expression 'height' $h_b$ of the bump is intended to indicate the distance that the bump projects into the line of the channel cross-section from the channel wall, regardless of whether that is in a vertical, horizontal or oblique direction. The bumps create turbulence in the airflow through the channels thereby encouraging mixing of the air at strategic longitudinal positions, sufficient to divert more of the cooler air into contact with channel walls, but not sufficient to significantly increase the airflow impedance of the channels.

The bumps 720 may be intermittent along the lengths of the channels 712, 713. The periodicity may vary as a function of distance along the length of the channel. The periodicity may provide a decrease in distance between bumps towards the outlet end of the channel. In this way, turbulent airflow mixing for thermal transfer from the plate to the airflows may on average increase towards the outlet end of the channel.

FIG. 3d shows a simulated temperature profile of the channel cross-sections of channels 712, 713 downstream of a bump 720 that has been extended into the cross-sectional airflow of each channel to locally disrupt the airflow. It can be seen in FIG. 3d that the regions F, G, H of lowest temperatures have been somewhat diminished in size, and the overall temperature gradient reduced.

FIG. 8 shows another arrangement of separator plate 800 in which the channels 812, 813 each include a thermally conductive structure in the form of a bump 820 which extends laterally into the channel cross-section towards the outlet end 811 of the channel 812, 813. In the example, the bump extends laterally from the sidewall of channels 813. A corresponding bump extends laterally the other way into channel 812.

In the example shown in FIG. 8, each bump 820 is opposite to a corresponding recess 821 in the facing channel wall thereby combining to create a chicane-like structure which forces at least parts of the channel airflow to deviate from the previously straight flow path. Successive bump 820/recess 821 structures may form a wavy path for the airflow thereby disrupting any tendency to laminar flow and reducing any temperature gradient across the channel width.

The lateral bumps 820, or the bumps 820 and recesses 821, can be disposed at any desired location or multiple locations along the lengths of the channels 812, 813, and can be different from channel to channel. More generally, the bumps 820 exemplify thermally conductive structures which extend into the channel cross-sections at any selected intermediate longitudinal positions in the channels, somewhere over the active area of the fuel cell. The bumps 820 (optionally with corresponding recesses 821) can extend any desired distance along the channels. Most preferably, the bumps 820/recesses 821 are positioned towards the outlet end 811 since this is where heat build-up tends to increase. For example, the bumps 820/recesses 821 could occupy the second longitudinal half of the channel length, or the final longitudinal third of the channel length, approximately as exemplified in FIG. 8. More generally, the thermally conductive structure exemplified by the bumps 820 may extend into the channel cross-section only somewhere, or everywhere, within a downstream portion of the channel length, such as a second longitudinal half of the channel length, or the final longitudinal third of the channel length.

The lateral 'height' $h_b$ of each bump is preferably somewhat less than the width w of each channel. The lateral height $h_b$ of the bumps may vary according to their longitudinal position in the channels. The bumps create turbulence in the airflow through the channels thereby encouraging mixing of the air at strategic longitudinal positions, sufficient to divert more of the cooler air into contact with channel walls, but not sufficient to significantly increase the airflow impedance of the channels.

The bumps 820 (optionally with corresponding recesses 821) may be intermittent along the lengths of the channels 812, 813. The periodicity may vary as a function of distance along the length of the channel. The periodicity may provide a decrease in distance between bumps towards the outlet end of the channel. In this way, turbulent airflow mixing for thermal transfer from the plate to the airflows may on average increase towards the outlet end of the channel.

The separator plates illustrated in connection with FIGS. 1 to 8 and 10 each exemplify a cathode separator plate combining both oxidant air supply channels 112 and cooling air supply channels 113. The separator plates as described herein could alternatively be configured as a separator plate providing only combined cathode oxidant and cooling air to channels that are fluidly coupled to the MEA, or as a separator plate providing only cooling air isolated from the MEA. The separator plates illustrated in connection with FIGS. 1 to 8 and 10 exemplify a cathode separator plate in which thermally conductive structures extend into the channel cross-sections on both sides of the separator plate, i.e. they extend into both the oxidant air supply channels and the cooling air supply channels. The separator plates of all embodiments described herein could alternatively be configured to have thermally conductive structures extending into the channels on only one side of the plate.

The channels illustrated in connection with FIGS. 1 to 8 and 10 are formed with rectangular cross-sections. In another arrangement, the channels could have a different geometry. An example is illustrated in FIG. 9. In particular, referring to FIG. 9a, the corrugation of the plate 900 may form triangular channels 901, 902 with closed tops at the apexes 903. In this arrangement, the thermally conductive structures extending into the channel cross-sections at selected intermediate longitudinal positions of the channels 901, 902 are exemplified by a series of fins 920 which extend obliquely into the channels. The fins 920 may be formed by pressed-through portions of the channel walls, as also seen in perspective view in FIGS. 9c and 9d. The size of the fins, e.g. the height of the pressed out and folded portion can be varied as a function of distance along the channel, as best seen in FIG. 9b, by varying the size of the cut out window 930, 931 . . . 937. In this instance, the window 930 provided towards the upstream inlet end 910 may have a smaller width, and therefore smaller height of fins 920, than the window 937 provided towards the downstream outlet end 911, where the greater width of the window 937 provides a greater height of fins 920. The fins 920 may have a length corresponding to the length of the respective window 930, 931 . . . 937.

As in previously described arrangements, particularly the fins 420, the fins 920 can be spaced at selected intermediate longitudinal positions, i.e. at any desired location or multiple locations along the lengths of the channels over the active areas of the fuel cell, and can be different from channel to channel. The windows 930 . . . 937 may be used to form one or two fins by appropriate cut and push-through operations. Most preferably, the fins 920 are positioned towards the outlet end (outlet end 911) since this is where heat build-up tends to occur. For example, the fins 920 could occupy the second longitudinal half of the channel length, or the final longitudinal third of the channel length. More generally, the thermally conductive structure exemplified by the fins 920 may extend into the channel cross-section only somewhere, or everywhere, within a downstream portion of the channel length, such as the second longitudinal half of the channel length, or the final longitudinal third of the channel length The cut and push-through arrangement may be used to create fins that are orthogonal to the channel base as an alternative to the oblique forms shown in FIG. 9a. The fins 920 may be intermittent along the lengths of the channels 901, 902. The periodicity may vary as a function of distance along the length of the channel. The periodicity may provide an increase in length of the fin towards the outlet end of the channel. In this way, surface area for thermal transfer to the airflows may on average increase towards the outlet end of the channel.

The cut and push-through arrangement may also be used to vary the level of communication of oxidant airflow that is able to reach the MEA through the size of windows 920 which can be further used to tune the balance between oxidant supply and cooling flows.

The separator plates illustrated in connection with FIGS. 1 to 9 each exemplify separator plates with thermally conductive structures extending into the channel cross-section, to locally vary the effectiveness of heat transfer from the plate into the airflow passing along channels in the plate. The thermally conductive structures could have varying levels of thermal conductivity not just by virtue of their size, shape and longitudinal extent along the channel, but could also very in thermal conductivity by virtue of the material or materials from which they are fabricated, or their coatings, for example.

The separator plates illustrated enable local variation in the effectiveness of heat transfer from the plate into the airflow passing along the channels in the plate without changing the width w of the channels. This can be advantageous if changing channel width could affect the localised compression of the underlying diffuser layer 106.

The separator plates illustrated can effectively enable the local heat transfer coefficient of the plate to be matched to the fuel cell heat generation profile. The separator plates illustrated can effectively enable optimization of heat transfer as a function of distance along the channels.

In creating an optimal design of separator plate, regard may be had to achieving a balance between conflicting requirements of minimising the total length and size of thermally conductive structures extending into the channel so as to create lowest optimal resistance to air flows through the channels, and maximising the total length and size of thermally conductive structures in the hottest regions of the fuel cell active area. The total length, size and longitudinal position of the thermally conductive structures within each channel may be varied according to the exact thermal profile of the stack at each channel, e.g. to take into account at least one or more of the following: channel height and channel width, separator plate width and length, channel position within the separator plate, separator plate position within the depth of the stack (heat build-up in the central zones of a stack tend to be greater than towards the end plates of a stack), thermal conductivity of the separator plate material, expected thermal output of the stack at normal or exceptional loads, and any other parameter that influences heat distribution within the stack.

Other embodiments are intentionally within the scope of the accompanying claims.

The invention claimed is:

1. A separator plate in an air-cooled fuel cell comprising:
   a series of airflow channels, each channel extending longitudinally between first and second opposing edges of the separator plate,
   each channel having a cross-sectional profile defining an airflow cross-section at points along the length of the channel, and,
   at least selected ones of the channels each having a thermally conductive structure extending into the channel cross-section at selected intermediate longitudinal positions of the channel, the positions being disposed over an active area of the fuel cell, to locally enhance heat transfer from the active area via the plate to airflow moving through the channel.

2. The fuel cell separator plate of claim 1 in which the thermally conductive structure extending into the channel cross-section is a fin.

3. The fuel cell separator plate of claim 2 in which the fin or bump varies in height as a function of distance along the length of the channel.

4. The fuel cell separator plate of claim 3 in which the height increases as a function of distance along the length of the channel.

5. The fuel cell separator plate of claim 2 in which the fin divides the channel into at least two airflow cross-sections each providing substantially laminar flow.

6. The fuel cell separator plate of claim 1 in which the thermally conductive structure extending into the channel cross-section is one or more bumps.

7. The fuel cell separator plate of claim 6 in which the bump lies in a channel wall opposite a recess.

8. The fuel cell separator plate of claim 1 in which the thermally conductive structure extending into the channel cross-section is a partition wall extending to the height or width of the channel cross-section.

9. The fuel cell separator plate of claim 8 in which the partition wall divides the channel into two or more sub-channels.

10. The fuel cell separator plate of claim 1 in which the thermally conductive structure into the channel cross-section only within a second longitudinal half of the channel.

11. The fuel cell separator plate of claim 1 in which the thermally conductive structure into the channel cross-section only within a final longitudinal third of the channel.

12. The fuel cell separator plate of claim 1 in which the thermally conductive structures vary in size for different channels in the series of channels.

13. The fuel cell separator plate of claim 1 in which the thermally conductive structures vary in length for different channels in the series of channels.

14. The fuel cell separator plate of claim 1 in which the thermally conductive structures vary in thermal conductivity along the length of the channel.

15. The fuel cell separator plate of claim 1 in which the series of airflow channels is defined by a first corrugated plate, and in which the thermally conductive structures extending into the channel cross-sections are defined by a second corrugated plate disposed adjacent to the first corrugated plate, the second corrugated plate having corrugations laterally offset from the corrugations of the first corrugated plate.

16. The fuel cell separator plate of claim 15 in which the lateral offset of the corrugations is created by the first and second corrugated plates having either (i) a different spatial frequency of corrugation, or (ii) the same spatial frequency of corrugation but with a phase shift therebetween.

* * * * *